United States Patent
Liao (10) Patent No.: US 9,036,381 B2
(45) Date of Patent: May 19, 2015

(54) ADDITIONAL ELECTRIC POWER RECEIVING METHOD AND DEVICE REPLACING CONVENTIONAL GROUNDING WITH NEGATIVE VOLTAGE SOURCE

(71) Applicant: ARBL CO., LTD., Taichung (TW)

(72) Inventor: Chung-Pin Liao, Taichung (TW)

(73) Assignee: ARBL CO., LTD, Taichung (TW)

( * ) Notice: Subject to any disclaimer, the term of this patent is extended or adjusted under 35 U.S.C. 154(b) by 153 days.

(21) Appl. No.: 13/757,618

(22) Filed: Feb. 1, 2013

(65) Prior Publication Data
US 2014/0218983 A1    Aug. 7, 2014

(51) Int. Cl.
*H02M 1/14*    (2006.01)
*H02M 7/04*    (2006.01)
*H02M 7/06*    (2006.01)

(52) U.S. Cl.
CPC ................ *H02M 7/04* (2013.01); *H02M 7/066* (2013.01)

(58) Field of Classification Search
CPC .... H02M 3/1584; H02M 1/14; H02M 1/4258
USPC ........ 363/15–20, 21.07, 21.12, 21.16, 34–40, 363/126, 127; 361/45, 49, 94, 96
See application file for complete search history.

(56) References Cited

U.S. PATENT DOCUMENTS

| | | | | |
|---|---|---|---|---|
| 4,222,096 A * | 9/1980 | Capewell | .......................... | 363/44 |
| 4,369,490 A * | 1/1983 | Blum | ............................... | 363/48 |
| 5,241,217 A * | 8/1993 | Severinsky | ..................... | 307/64 |
| 5,384,792 A * | 1/1995 | Hirachi | ........................... | 714/14 |
| 5,602,464 A * | 2/1997 | Linkowsky et al. | ........... | 323/272 |
| 5,886,892 A * | 3/1999 | Radley et al. | .................. | 363/126 |
| 6,407,936 B1 * | 6/2002 | Tang | ............................... | 363/44 |

OTHER PUBLICATIONS

Lessons in Electric Circuits vol. 1-DC, chapter 3, by Tony R. Kuphaldt (revised Oct. 2006).*

* cited by examiner

*Primary Examiner* — Rajnikant Patel
(74) *Attorney, Agent, or Firm* — Muncy, Geissler, Olds & Lowe, P.C.

(57) ABSTRACT

An additional electric power receiving method replacing conventional grounding with a negative voltage source includes the step of transmitting electromagnetic wave or current from a power supply source to a rectifier, wherein a grounding end of the rectifier is in electrical communication with the negative voltage source, and the negative voltage source is selected from a negative potential intrinsic of an organism. A device applicable to the electric power receiving method includes a rectifier having an input end and two output ends, wherein the input end is in electrical communication with a power supply source, and rectified direct current is transmitted from the output ends. With the method and device, not only an increase in additional electric power obtained is achieved, but conversion efficiency and stability of current and electromagnetic wave is enhanced.

10 Claims, 7 Drawing Sheets

ADDITIONAL ELECTRIC POWER RECEIVING METHOD AND DEVICE REPLACING CONVENTIONAL GROUNDING WITH NEGATIVE VOLTAGE SOURCE

BACKGROUND OF THE INVENTION

1. Technical Field

The present invention relates to electric power receiving method and device, and more particularly, to an additional electric power receiving method and device replacing conventional grounding with a negative voltage source.

2. Description of Related Art

Figure 1:
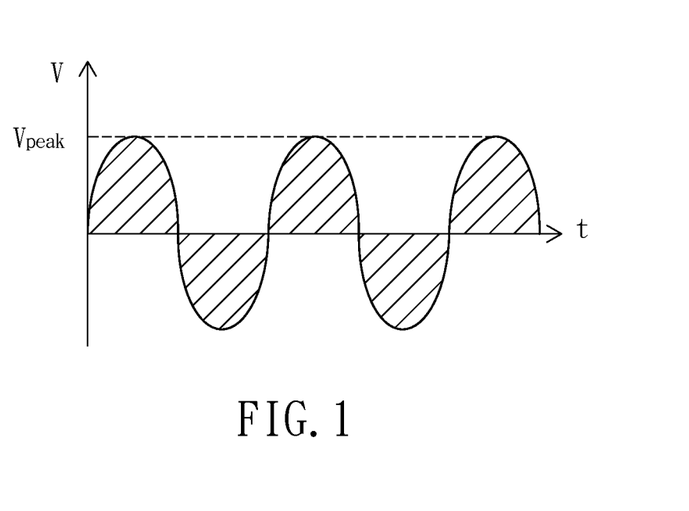
FIG. 1 shows a waveform diagram of alternating current.
Figure 2:
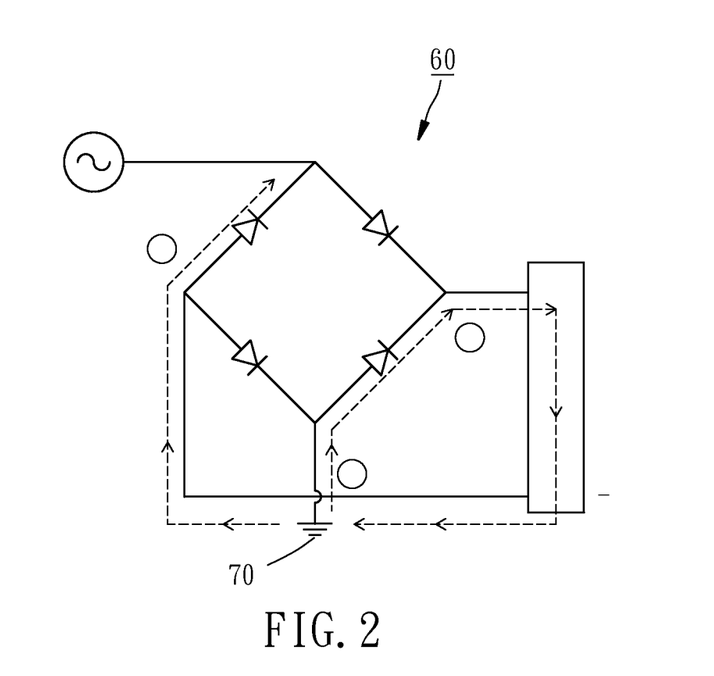
FIG. 2 is a schematic view of a full-wave rectifier.

Conventional ways of converting alternating current into direct current mostly require using a rectifier as a conversion device and in particular require a full-wave rectifier disposed between an electric power source for supplying alternating current and an output end such that, as shown in FIG. 1, positive half-cycle waveform and negative half-cycle waveform of absolute alternating current waveform are fully converted into the same polarity to thereby output direct current. Referring to FIG. 2, there is shown a schematic view of a full-wave rectifier 60. In fact, the full-wave rectifier 60 provides positive charges by means of local grounding GND 70 to thereby convert a negative half-cycle waveform of an alternating current input waveform into a positive waveform. That is to say, the earth itself functions as an enormous positive and negative charges depository that supplies positive charges required for the negative half-cycle stage to thereby convert a waveform to a positive one (indicated by the "dashed line" route shown in FIG. 2.)

The aforesaid way of conversion works well, not only because of the presence of an impartial absolute ground potential, but also because the zero level (ground level) of absolute alternating current waveform equals the absolute ground potential. Due to natural environmental reasons and manmade factors, it is well known that local ground potentials differ, depending on the location on the earth. Although the local ground potential varies from location to location, the phenomenon does not cause nuisances to electrical, electronic, and electric power application engineering nowadays. In fact, addition of a center pole to the full-wave rectifier in a proper manner ensures that the zero level of the absolute alternating current waveform equals the local ground potential. Although it is not uncommon that electronic noise interference occurs because of wide-area non-uniformity in grounding potential, rectification of a circuit waveform seldom happens, especially to electric power generation and transmission engineering.

However, the aforesaid prior art has never been able to take additional considerable electric power and power supply in parallel and simultaneously.

BRIEF SUMMARY OF THE INVENTION

It is an objective of the present invention to provide an additional electric power receiving method and device replacing conventional grounding with a negative voltage source. The negative voltage source is selected from a negative voltage source intrinsic of an organism. With the electric power receiving method and device of the present invention, not only does additional electric power derived from the negative voltage source (such as an organism) increase, but electric power conversion efficiency and stability is enhanced.

In order to achieve the above and other objectives, the present invention provides an additional electric power receiving method replacing conventional grounding with a relative negative voltage source, such as a negative voltage intrinsic of an organism. In the first place, a rectifier receives current or electromagnetic wave (including sunlight) provided by a power supply source. Then, have a negative voltage source in electrical communication with the rectifier, such that electric power generated from the rectifier is no less than the electric power supplied by the power supply source. A device for use with the electric power receiving method comprises a power supply source, a rectifier, and a negative voltage source. The rectifier has an input end and at least one output end. The input end is in electrical communication with the power supply source and transmits rectified direct current from the output end. The negative voltage source is in electrical communication with the rectifier. Due to the aforesaid technical features, the present invention achieves an additional increase in the obtainable electric power and enhances current conversion efficiency and stability.

In a preferred embodiment of the present invention, the rectifier is a full-wave rectifier. The full-wave rectifier has a grounding end. The power supply source is in electrical communication with the input end. The negative voltage source is in electrical communication with the grounding end.

In a preferred embodiment of the present invention, the rectifier is a half-wave rectifier. The half-wave rectifier has the input end and the output end. The power supply source is in electrical communication with the input end. The negative voltage source is series-connected to the output end.

In a preferred embodiment of the present invention, the negative voltage source is a plant or a solution which contains bacteria or chlorophyll. Preferably, the negative voltage source is irradiated with sunlight and supplied with additional carbon dioxide.

In a preferred embodiment of the present invention, the power supply source is an alternating current source, a solar panel, electromagnetic radiation, or an electromagnetic induction conductor.

Detailed structures, features, and technical solutions of the present invention are hereunder described with embodiments. However, persons skilled in the art are able to understand that the detailed description and specific embodiments of the present invention are illustrative of the present invention rather than restrictive of the claims of the present invention.

DETAILED DESCRIPTION OF THE INVENTION

Figure 3:
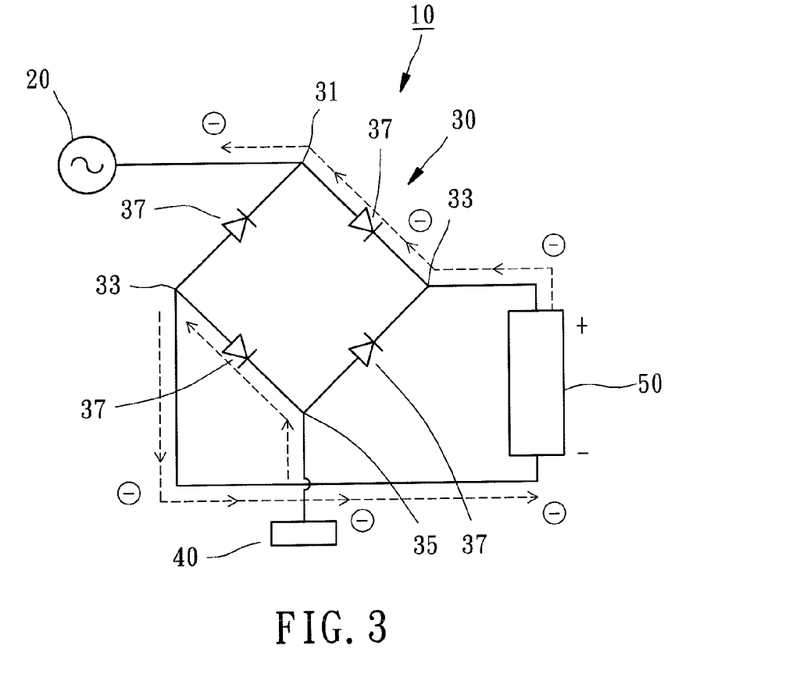
FIG. 3 is a schematic view of an electric power receiving device according to the first preferred embodiment of the present invention, wherein a negative voltage source is in electrical communication with a local grounding end of the full-wave rectifier.

Technical solutions and features of the present invention are described in detail with preferred embodiments read in conjunction with the accompanying drawings. Referring to FIG. 3, in the first preferred embodiment of the present invention, an additional electric power receiving device 10 replacing local grounding with a negative voltage source essentially comprises a power supply source 20, a rectifier 30, and a negative voltage source 40. In this preferred embodiment, the power supply source 20 can be an alternating current source, a conductor for collecting electromagnetic wave, a solar cell module, or electromagnetic radiation, such as a fluorescent lamp signal.

The power supply source 20 is in electrical communication with the rectifier 30. In this preferred embodiment, the rectifier 30 is a full-wave rectifier. The full-wave rectifier 30 has an input end 31, two output ends 33, and a grounding end 35. The input end 31 is in electrical communication with the power supply source 20, such that alternating current is rectified by diodes 37 to thereby generate and transmit direct current. The grounding end 35 of the full-wave rectifier 30 is in direct electrical communication with the negative voltage source 40. The negative voltage source 40 can be an organism, such as a plant or a solution which contains bacteria, yeast, or chlorophyll. Preferably, the negative voltage source 40 is irradiated with sunlight and supplied with additional carbon dioxide.

An electric power receiving method for use with the device 10 according to the present invention comprises the steps of:

1. the full-wave rectifier 30 receives alternating current or electromagnetic radiation (including sunlight) provided by the power supply source 20;

2. since the negative voltage source 40 is in electrical communication with the grounding end 35 of the rectifier 30, the absolute value of the voltage level of the negative voltage source 40 can be larger than, equal to, or less than the largest absolute value of the voltage level of the power supply source 20.

Upon rectification of electromagnetic radiation or alternating current provided by the power supply source 20 in the above steps, additional electric power can be obtained through the two output ends 33. Electric power transmitted from the rectifier 30 is no less than electric power supplied by the power supply source 20. An oscilloscope 50 measures the two output ends 33 to determine the average potential difference of the device 10.

Figure 4:
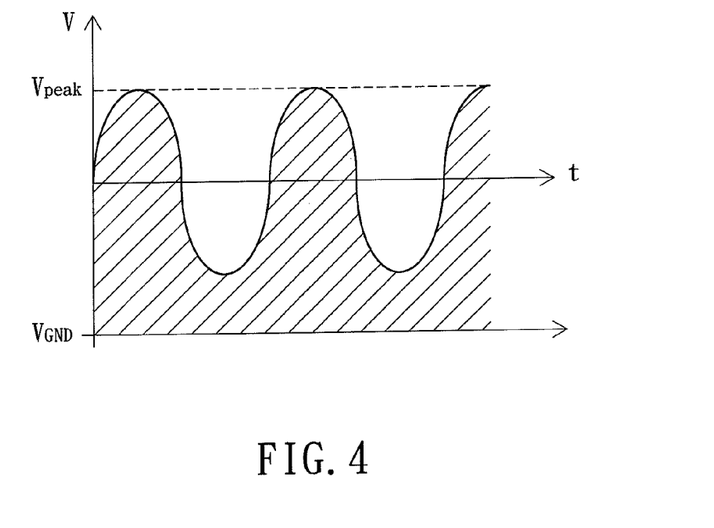
FIG. 4 shows a waveform diagram after rectification performed by the electric power receiving device according to the first preferred embodiment of the present invention, wherein the potential of the local grounding end is lower than the zero level of the input alternating current waveform, where $|V_{GND}| > |V_{peak}|$.

If voltage level ($V_{GND}$) of the negative voltage source 40 is lower than the zero level of the absolute alternating current waveform, and the absolute value of the voltage level of the negative voltage source 40 is larger than the largest absolute value of the voltage level ($V_{peak}$)($|V_{GND}|>|V_{peak}|$) of the alternating current waveform, then its rectification is depicted by FIG. 4 in which the hatched area defined between the bottom of the current waveform and the absolute value of the voltage level ($V_{GND}$) of the negative voltage source 40 denotes the electric power obtained after rectification.

Figure 5:
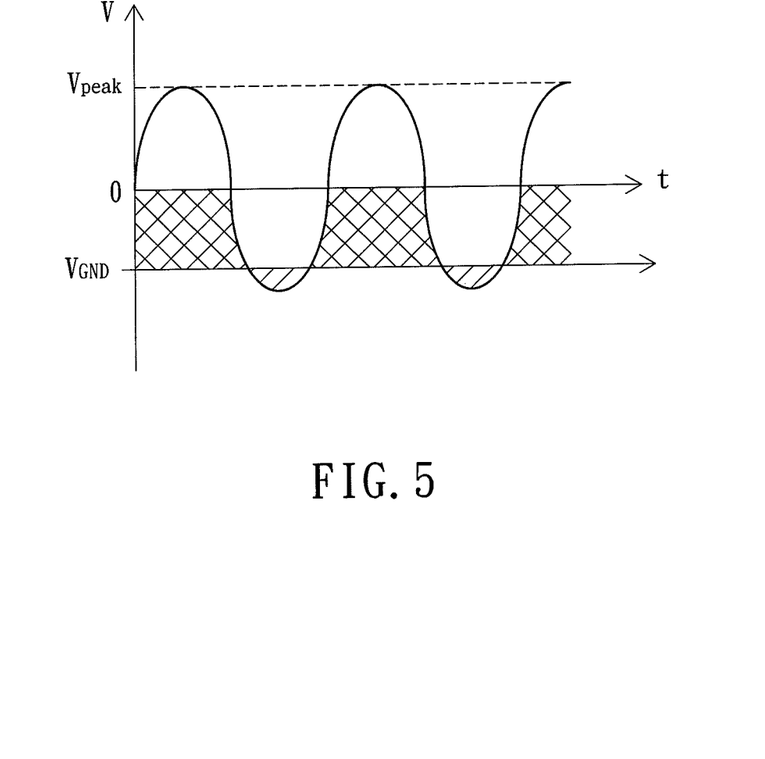
FIG. 5 shows an alternating current waveform diagram prior to rectification performed by the electric power receiving device according to the first preferred embodiment of the present invention, wherein the potential of the local grounding end of the electric power receiving device of the present invention is lower than the zero level of the input alternating current waveform, where $|V_{GND}| < |V_{peak}|$.
Figure 6:
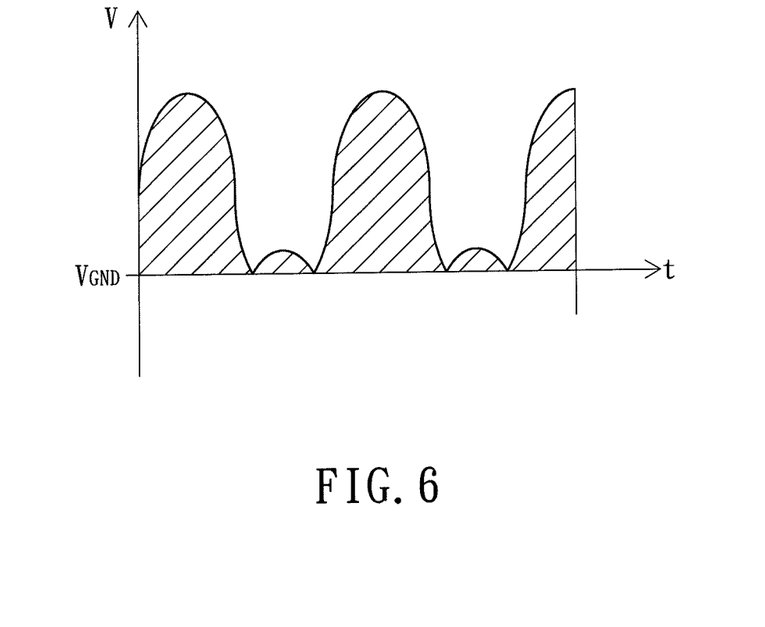
FIG. 6 shows a waveform diagram after rectification performed by the electric power receiving device according to the first preferred embodiment of the present invention, wherein the potential of the local grounding end of the electric power receiving device of the present invention is lower than the zero level of the input alternating current waveform, where $|V_{GND}|<|V_{peak}|$.

Referring to FIG. 5, if voltage level ($V_{GND}$) of the negative voltage source 40 is lower than the zero level of the absolute alternating current waveform, and the absolute value of the voltage level of the negative voltage source 40 is less than the largest absolute value of the voltage level ($|V_{GND}|<|V_{peak}|$) of the alternating current waveform, then both the potential part (the hatched area shown in FIG. 5) defined below the negative voltage source 40 in the alternating current waveform and the electric power area (the crosshatched area shown in FIG. 5) defined between the zero level of alternating current waveform positive half-cycle and the negative voltage source 40 are supplied with electric power from the negative voltage source 40 to thereby achieve the goal of receiving additional electric power. Upon completion of rectification, the waveform diagram shown in FIG. 6 is obtained.

Figure 8:
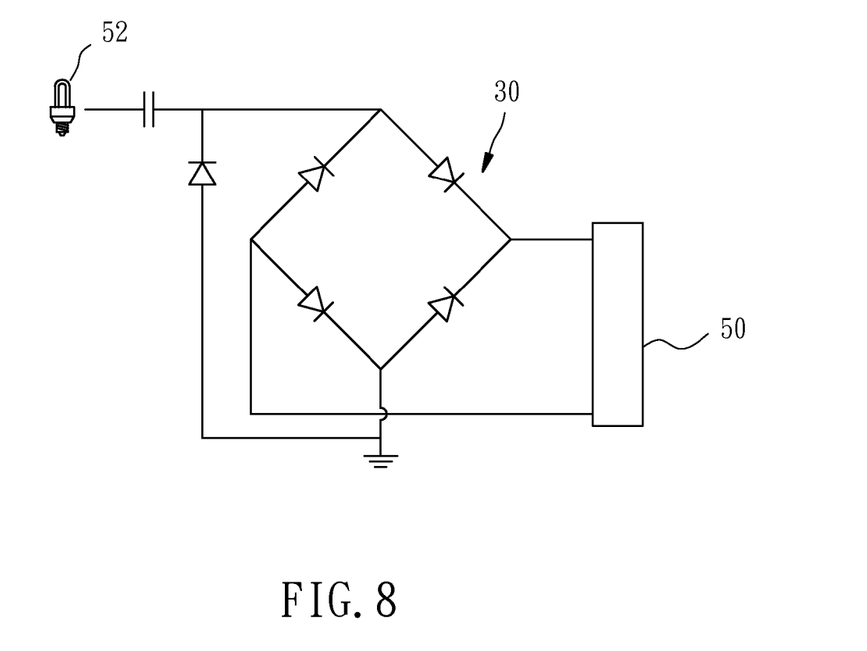
FIG. 8 is a circuit diagram of a control group according to the present invention.
Figure 9:
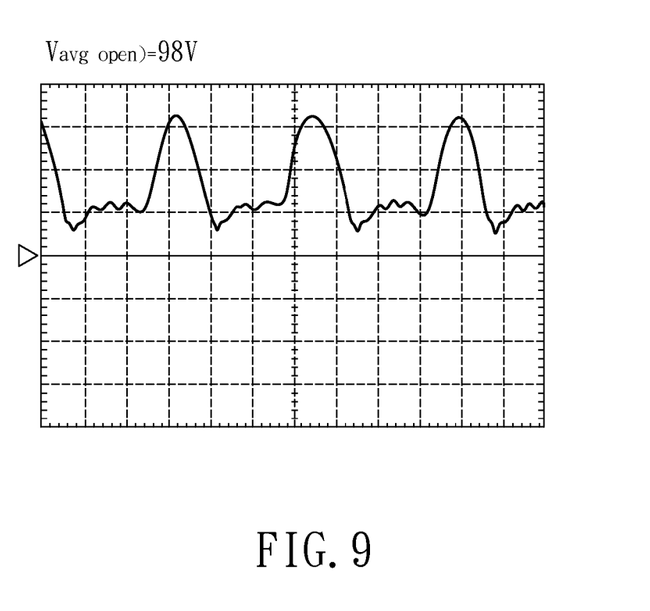
FIG. 9 shows a graph of actual measurement results of the control group.

Referring to FIG. 8 and FIG. 9, to prove the effectiveness of the present invention, the power supply source for use in a control group employed in an experiment performed according to the present invention is exemplified by electromagnetic radiation emitted from a fluorescent lamp composed of four T5 fluorescent tubes 52 and grounded in a conventional way (about 50 mW, that is, the output prior to its electrical communication with the negative voltage source 40 includes: average open-circuit voltage of 98V and short-circuit current 0.5 mA).

Figure 10:
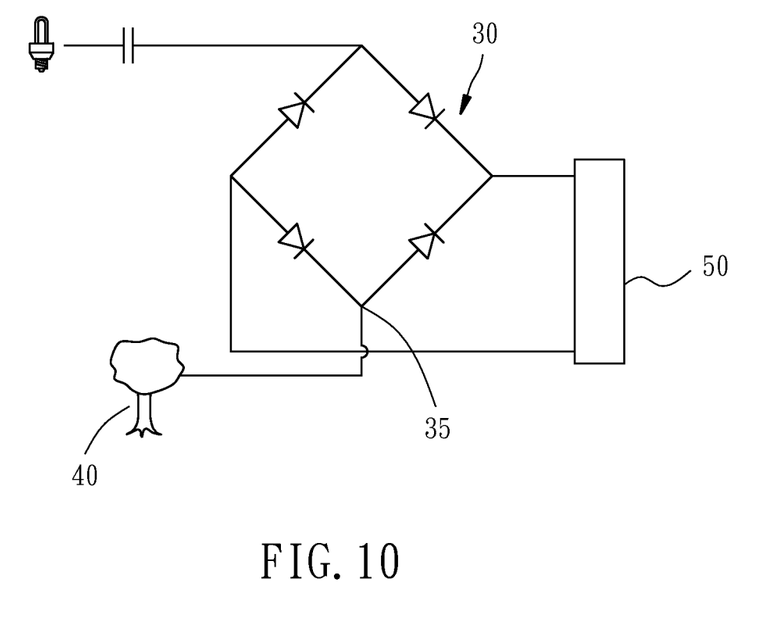
FIG. 10 is a circuit diagram according to the second preferred embodiment of the present invention, wherein the negative voltage source is provided in the form of series-connected plants.
Figure 11:
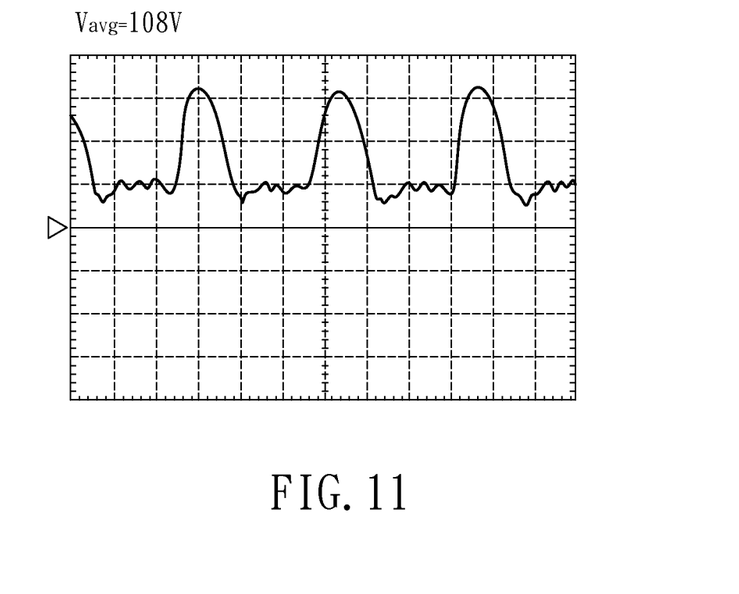
FIG. 11 shows a graph of actual measurement results according to the second preferred embodiment of the present invention.
Figure 12:
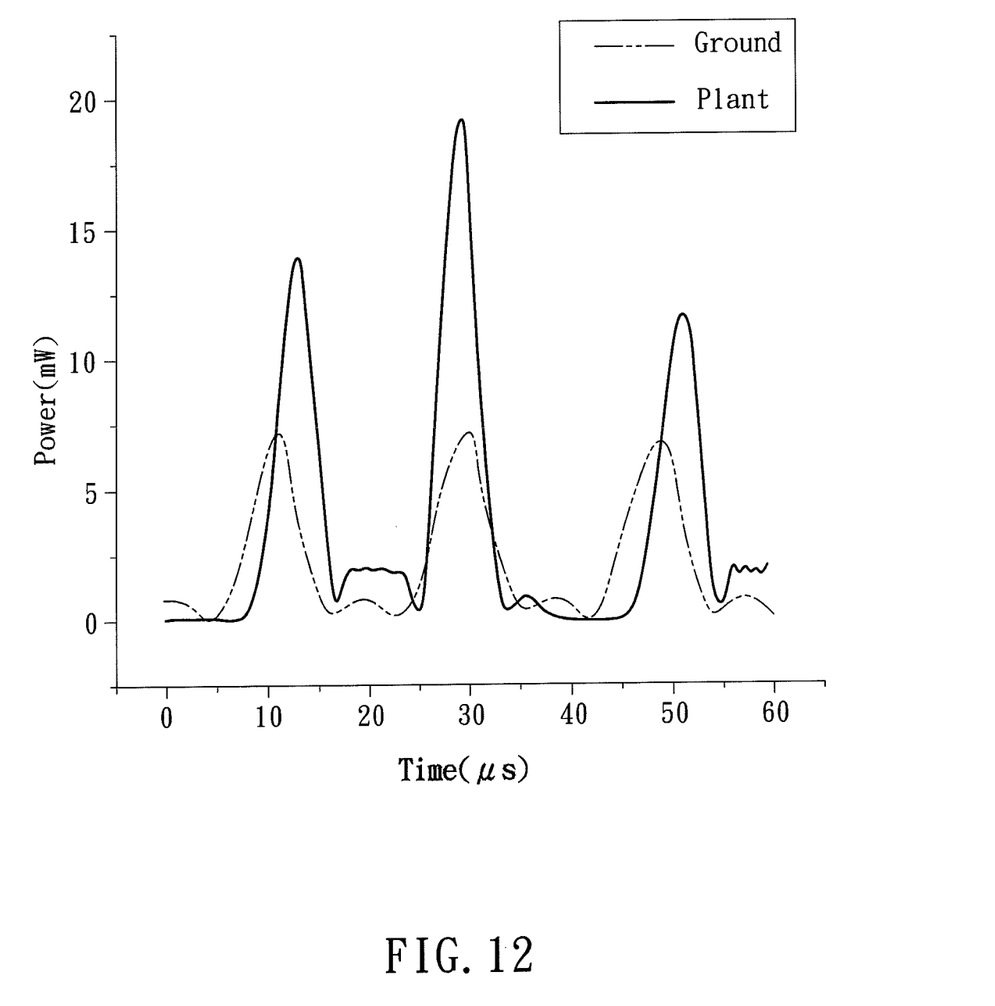
FIG. 12 shows two graphs of experimental measurement results.

Referring to FIG. 10 through FIG. 12, in the second preferred embodiment of the present invention, the grounding end 35 of the rectifier 30 floatingly connects to the negative voltage source 40 that consists of four series-connected plants. The plants 40 are potted medium-sized bird-of-paradise flower irradiated with absolute visible light 100 W/m² of generally simulated indoor sunlight and supplied with substantially constant 800 ppm of carbon dioxide at 50° C., such that the grounding end 35 provides a relatively negative potential, wherein the negative voltage source 40 provides negative potential ($|V_{GND}|<|V_{peak}|$) for the plants.

The measurement results indicate that, in the second preferred embodiment of the present invention, output power of 105 mW approximately (an average open-circuit voltage of 108V, and a short-circuit current of 1 mA approximately) is available continuously, that is, about 114% of electric power is obtained additionally. With the input power being invariable (for example, a fixed amount of light irradiation or electromagnetic wave is input), the extra amount of electric power provided in this situation originates from the negative voltage source 40, wherein its electronic flow route is indicated by the dashed line in FIG. 3.

Figure 7:
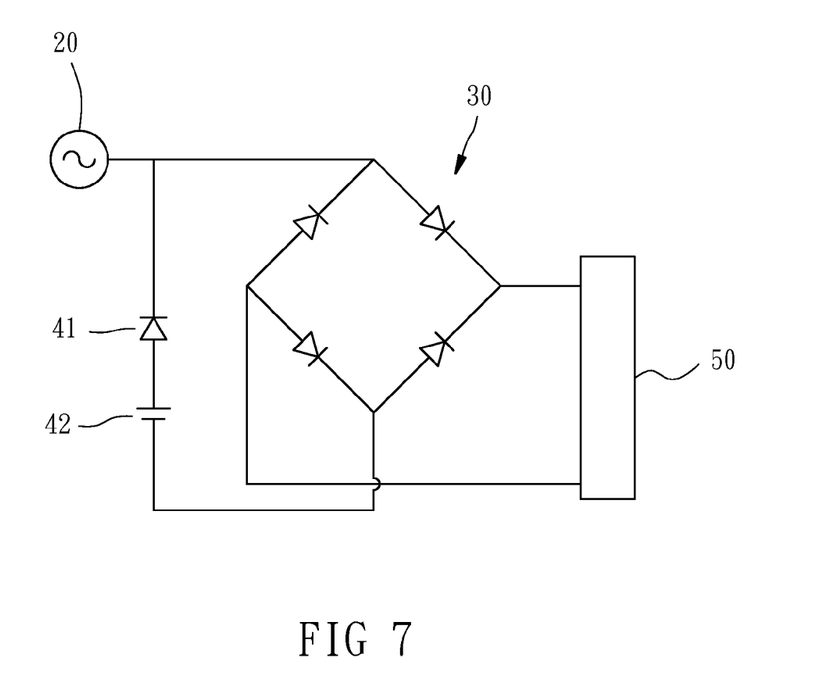
FIG. 7 is an equivalent circuit which uses a negative voltage source intrinsic of an organism according to the present invention.

Assuming that non-uniformity in grounding potential within a small area is unlikely to be attainable, the local ground potential is replaced with the negative voltage source 40 intrinsic of an organism. Hence, if the absolute value of the voltage level of the negative voltage source 40 is less than the largest absolute value of the voltage level (when $|V_{GND}|<|V_{peak}|$) of the alternating current input waveform, then the portion below $V_{GND}$ within the negative half-cycle waveform of the alternating current waveform and the portion between $V_{GND}$ and the zero level of the positive half-cycle waveform will be rectified by electric power supplied by the organism, wherein the extra electric power thus obtained is indicated by the hatched area shown in FIG. 6. If the absolute value of the voltage level of the negative voltage source 40 is larger than the largest absolute value of the voltage level (when $|V_{GND}|>|V_{peak}|$) of the alternating current input waveform, then the extra electric power thus obtained is indicated by the hatched area shown in FIG. 4. The aforesaid organism-derived negative potential effect can be proved by a combination of an equivalent diode 41 and a battery 42 which are shown in FIG. 7 in accordance with circuit theory. However, from the perspective of relative grounding and the organism-derived additional electric power, it is meaningless to achieve the aforesaid benefits by means of another battery.

The aforesaid benefits of the present invention can be achieved without a good understanding as to what mechanisms for electric power generation, transmission, and distribution are found in various forms of organism, because it is well known that a wide variety of organism is capable of generating organism-derived additional electric power by nutrition intake and photosynthesis. It is feasible that the rectifier of the present invention is replaced with a half-wave rectifier, characterized in that: the half-wave rectifier has an input end and an output end; the power supply source is in electrical communication with the input end; and a negative voltage source is series-connected to the output end. In doing so, the objective and benefits of the present invention can be achieved.

The constituent elements disclosed above according to preferred embodiments of the present invention are intended to be illustrative of the present invention rather than restrictive of the scope of the present invention. All replacements or changes made to the preferred embodiments of the present invention, using other equivalent elements, should be regarded as falling into the scope of the claims of the present invention.

What is claimed is:

1. An additional electric power receiving method replacing local grounding with a negative voltage source, the method comprising the steps of:
   a. receiving by a rectifier electromagnetic radiation or current provided by a power supply source; and
   b. obtaining additional electric power provided by the negative voltage source when the negative voltage source is in electrical communication with the rectifier in an open-looped path,
   wherein a voltage level of the negative voltage source is lower than a zero level of an absolute alternating current waveform.

2. The additional electric power receiving method of claim 1, wherein, the rectifier is a full-wave rectifier having an input end and a grounding end, the power supply source being in electrical communication with the input end, and the negative voltage source being in electrical communication with the grounding end.

3. The additional electric power receiving method of claim 1, wherein the negative voltage source is a plant or a solution which contains chlorophyll or bacteria.

4. The additional electric power receiving method of claim 3, wherein the negative voltage source is irradiated with sunlight or supplied with additional carbon dioxide.

5. The additional electric power receiving method of claim 1, wherein the power supply source is an alternating current source, a solar panel, an electromagnetic induction conductor, or electromagnetic radiation.

6. An additional electric power receiving device replacing local grounding with a negative voltage source, the additional electric power receiving device comprising:
   a power supply source;
   a rectifier having an input end and an output end, the input end being in electrical communication with a power supply source and outputting a rectified direct current from the output end; and
   the negative voltage source in electrical communication with the rectifier in an open-looped path;
   wherein a voltage level of the negative voltage source is lower than a zero level Of an absolute alternating current waveform.

7. The additional electric power receiving device of claim 6, wherein the rectifier is a full-wave rectifier having an input end and a grounding end, the power supply source being in electrical communication with the input end, and the negative voltage source being in electrical communication with the grounding end.

8. The additional electric power receiving device of claim 6, wherein the negative voltage source is a plant or a solution which contains chlorophyll or bacteria.

9. The additional electric power receiving device of claim 8, wherein the negative voltage source is irradiated with sunlight or supplied with additional carbon dioxide.

10. The additional electric power receiving device of claim 6, wherein the power supply source is an alternating current source, a solar panel, an electromagnetic induction conductor, or electromagnetic radiation.

\* \* \* \* \*